US005261640A

United States Patent [19]

Yuan

[11] Patent Number: 5,261,640

[45] Date of Patent: Nov. 16, 1993

[54] PORTABLE ENGINE HOIST

[75] Inventor: Francis G. Yuan, Shanghai, China

[73] Assignee: Super Test Corporation, Taipei, Taiwan

[21] Appl. No.: 950,237

[22] Filed: Sep. 24, 1992

[51] Int. Cl.[5] .................... B60P 1/48

[52] U.S. Cl. .................... 254/8 B

[58] Field of Search .................... 269/17, 901; 254/124, 254/8 B, 8 R, 2 B, 2 R, 4 B, 4 R

[56] References Cited

U.S. PATENT DOCUMENTS 3,521,860 7/1970 Zehrung .................... 254/124
3,599,812 8/1971 Hasstedt .................... 254/8 B
4,190,233 2/1980 Godfrey .................... 254/8 B
4,533,127 8/1985 Hawkins .................... 269/17
4,669,703 6/1987 Hawkins et al. .................... 254/124
4,705,264 11/1987 Hawkins et al. .................... 269/17
5,100,283 3/1992 Carty .................... 254/8 B

*Primary Examiner*—Robert C. Watson
*Attorney, Agent, or Firm*—Kokjer, Kircher, Bowman & Johnson

[57] ABSTRACT

A portable engine hoist which folds into a compact storage condition. A base of the hoist is equipped with two caster wheels. Two elongated feet extend from the base and carry wheels on their outboard ends. An upright post extends from the base and carries a pivotal lifting beam at its top end. A mechanical jack operates to pivotally raise and lower the lifting beam to raise and lower an engine. An inclined brace extends from the post and carries a cross arm which may be bolted to the feet to provide a rigid brace structure. When the cross arm is unbolted from the feet, it may be pivoted until it is clear of the feet. The feet can then be pivoted upwardly and latched for storage of the hoist.

16 Claims, 3 Drawing Sheets

PORTABLE ENGINE HOIST

BACKGROUND OF THE INVENTION

This invention relates generally to an engine hoist and more particularly to an engine hoist which may be rolled along a floor or other surface to the desired position and which may be folded into a compact storage position when not in use.

In the servicing and repair of motor vehicles, it is often necessary to remove and replace the engine. Although various types of hoist mechanisms have been developed for the handling of engines, they have not been altogether satisfactory. Typically, engine hoists take the form of heavy duty equipment which is complicated and expensive. In addition, the engine hoist occupies a considerable amount of space which is a decided disadvantage in most applications where space is at a premium.

SUMMARY OF THE INVENTION

The present invention is directed to a portable engine hoist which is uniquely constructed so that it can be easily rolled along the floor or other surface to the proper position for performing its function of removing or replacing an engine. The hoist of the present invention is further characterized by a construction which enables it to assume a compact condition in order to minimize the space it occupies when not being used.

In accordance with the invention, an engine hoist includes a base having a pair of caster wheels near its opposite ends. A pair of elongated feet extend from the base and carry wheels on their outboard ends. An upright post extends from the base and carries a pivotal lifting beam on its top end. A jack mechanism is arranged to raise and lower the lifting beam when the jack is extended and retracted. The beam may be equipped with a telescoping extension which carries a hook for receiving lifting tackle that may be applied to the engine.

The hoist has a unique brace structure which includes a rigid brace extending at an incline from the post. A cross arm is pivoted to the bottom end of the brace. The cross arm normally spans the two feet and is bolted to them in order to secure the feet in their operating position with the brace and cross arm providing rigid bracing between the post and the feet.

When not in use, the hoist can be folded up for storage. After the bolts connecting the cross arms to the feet have been removed, the cross arm can be pivoted on the brace to provide clearance so that the feet can be swung upwardly and latched in vertical positions extending on opposite sides of the post. The cross arm has a foot extension which rests on the floor when the feet are raised. In the storage position, the jack is fully retracted and the lifting beam then extends downwardly from the top end of the post with the beam extension retracted to minimize the beam length.

DESCRIPTION OF THE DRAWINGS

In the accompanying drawings which form a part of the specification and are to be read in conjunction therewith and in which like reference numerals are used to indicate like parts in the various views.

DETAILED DESCRIPTION OF THE INVENTION

Figure 1:
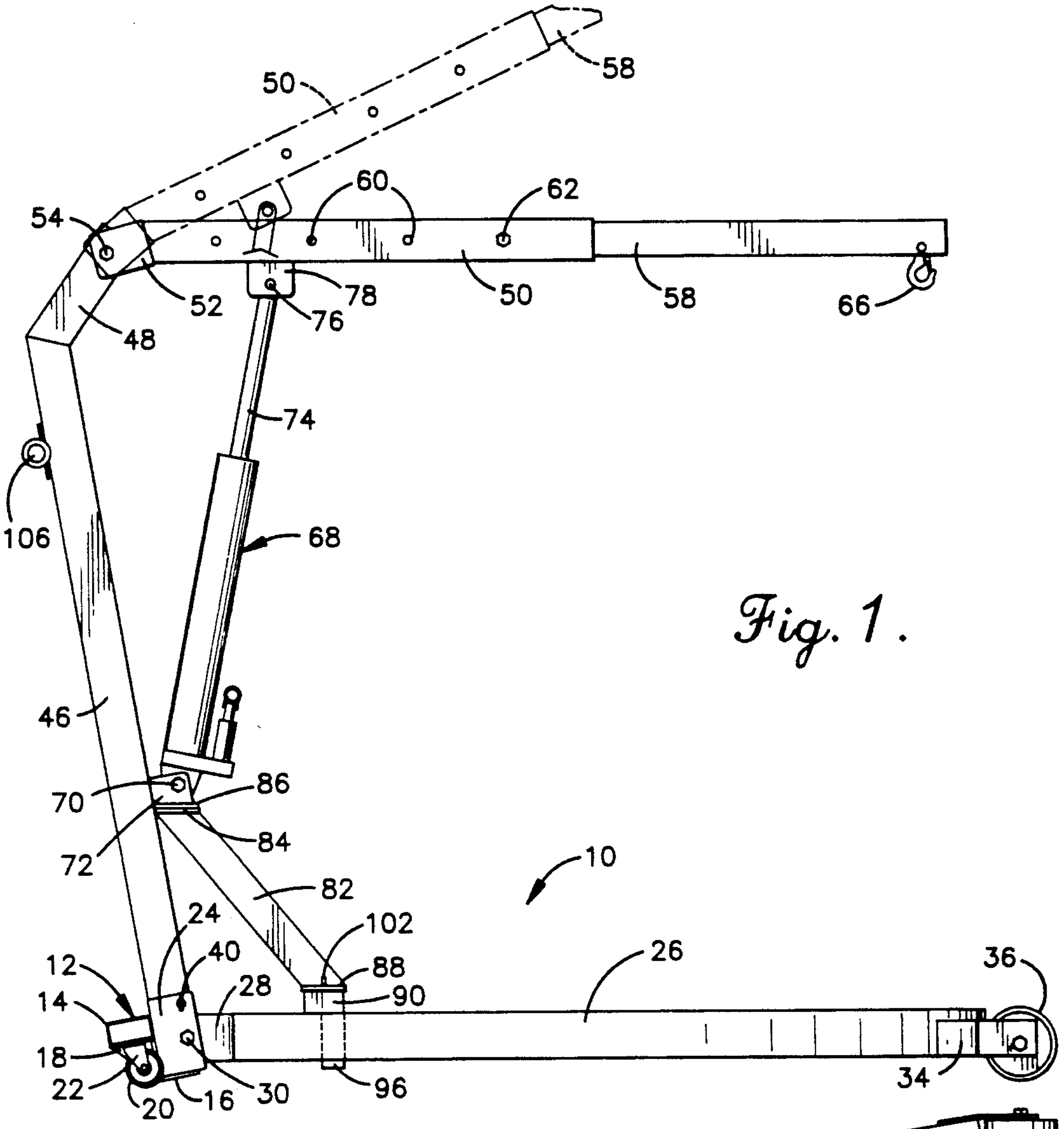
FIG. 1 is a side elevational view of a portable engine hoist constructed according to a preferred embodiment of the present invention, with the lifting beam shown in solid lines extending in a generally horizontal orientation and in broken lines extending upwardly to raise an engine that is being handled by the unit.

Referring now to the drawings in more detail, numeral 10 generally designates a portable hoist which is used for the removal and replacement of vehicular engines. The hoist has a base which is generally identified by numeral 12 and which includes a square tube 14 welded or otherwise secured to an angle member 16. Triangular gusset plates 16 are used to reinforce the connection between the base tube 14 and the angle 16. A pair of caster wheels 20 are secured to the bottom of the tube 14 near its opposite ends. Each of the wheels 20 is supported to rotate on a swivel bracket 22 which is in turn connected with the base tube 14 to turn about a generally vertical axis in a known fashion. The wheels 20 are in contact with a floor or other support surface when the hoist is being used.

Figure 2:
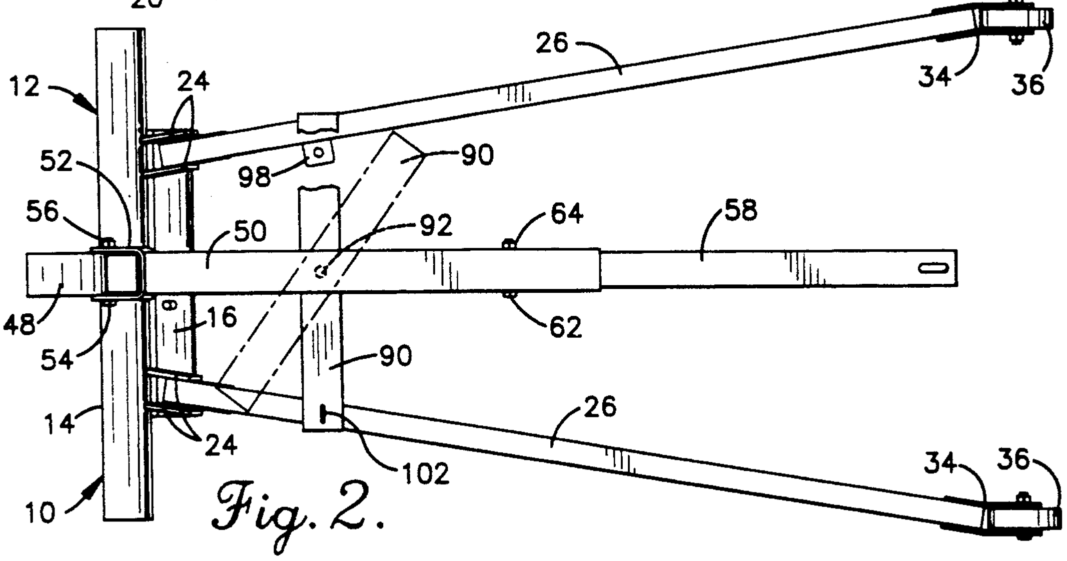
FIG. 2 is a top plan view of the engine hoist shown in FIG. 1, with portions broken away for purposes of illustration and the broken lines indicating pivotal movement of the cross arm to provide clearance for folding the elongated feet up and down.
Figure 9:
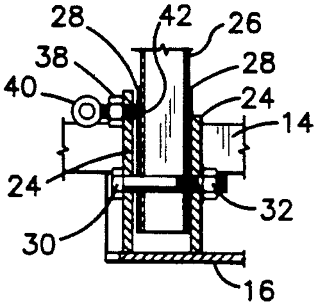
FIG. 9 is a fragmentary sectional view on an enlarged scale taken generally along line 9—9 of FIG. 6 in the direction of the arrows.

As best shown in FIG. 2, the angle member 16 is somewhat shorter than tube 14. A pair of parallel, spaced apart bracket plates 24 are secured near each end of the angle member 16 by welding or in another suitable manner. The hoist includes a pair of elongated feet 26 which may take the form of rectangular tubes. The inboard ends of the feet 26 are received between the pairs of bracket plates 24. As best shown in FIG. 9, the inboard end of each of the feet 26 is reinforced by a pair of plates 28 welded to the opposite sides of the foot 26. A bolt 30 is extended through each pair of bracket plates 24 and the corresponding foot 26, and a nut 32 is threaded onto each bolt 30. The bolts 30 are aligned with one another and establish a horizontal pivot axis about which the feet 26 may be swung between the horizontal operating position shown in FIG. 5 and the generally vertical storage position shown in FIG. 6.

As best shown in FIG. 2, the bracket plates 24 are oriented at a slight outward angle such that the feet 26 diverge away from the base 12 when the feet are in the operating position. The outboard end of each foot 26 is provided with a wheel bracket 34 which in turn receives a wheel 36 which is rotatable on the bracket 34.

The wheels 36 are in contact with the floor when the hoist is operated. It is noted that the brackets 34 are bent near their centers such that the wheels 36 have a common rotational axis which is parallel to the length dimension of the base 12.

As best shown in FIG. 9, the outer bracket plate 24 in each pair is provided with a nut 38 which may be welded to the outer surface of the bracket plate in alignment with an opening formed through the plate 24. An eye-bolt 40 is threaded through the nut 38. The tip of the eye-bolt 40 confronts one of the reinforcing plates 28. A tapered opening 42 is formed in the reinforcing plate 28 at a location to align with the tip of the eye-bolt 40 when the corresponding foot is swung upwardly to the storage position shown in FIG. 6. The eye-bolt 40 may then be tightened such that its tip enters the tapered opening 42, thus releaseably latching the foot in its storage position. The eye-bolt 40 may be threaded out of the nut 38 in order to remove its tip from the opening 42, thus releasing the foot 26 and permitting it to be swung downwardly to the operating position.

Figure 4:
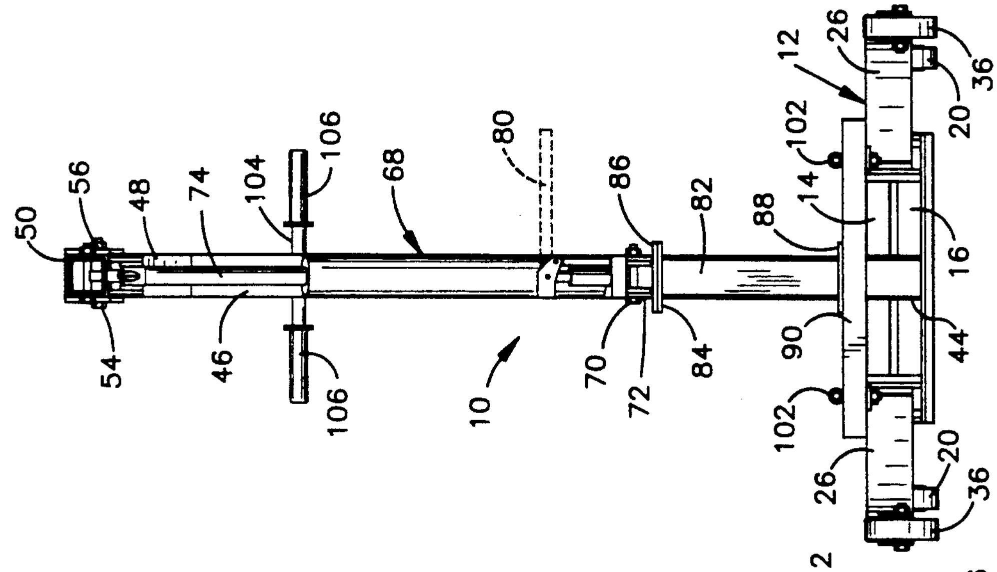
FIG. 4 is a front elevational view of the engine hoist, with the broken lines depicting the jack handle applied for operation of the jack.
Figure 3:
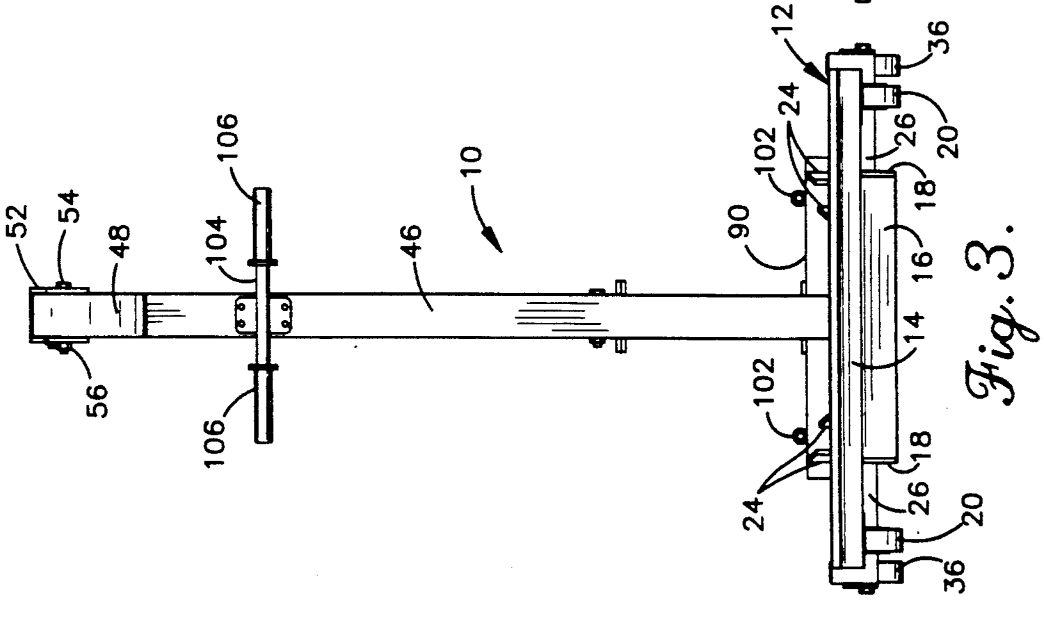
FIG. 3 is a rear elevational view of the engine hoist.

A square tube 44 (see FIG. 4) is secured to the center of the angle member 16. The tube 44 is open at the top and receives the lower end of a generally upright post 46 which is suitably secured to the tube 44. The post 46 may be constructed of a square tube and preferably angles rearwardly somewhat as it extends upwardly from the base 12. The post 46 has a top end portion 48 which angles forwardly and upwardly and which pivotally mounts a lifting beam 50. The lifting beam 50 is provided on its inboard end with a clevis 52 which receives the end portion 48 of the post. A horizontal bolt 54 extends through the clevis 52 and the end portion 48 and is secured by a nut 56 (see FIG. 2). The bolt 54 provides a horizontal pivot axis about which the lifting beam 50 may be swung upwardly and downwardly relative to the post.

An extension beam 58 fits telescopically in the lifting beam 50. The extension beam 58 may be extended and retracted relative to the lifting beam 50. The lifting beam 50 is provided with a plurality of openings 60, and the extension beam may be extended and retracted until an opening (not shown) through the extension beam aligns with the desired opening 60. A bolt 62 may then be extended through the aligned openings and secured by a nut 64 (FIG. 2) in order to rigidly secure the lifting and extension beams together. In this fashion, the effective length of the lifting beam can be adjusted as desired. The outer end of the extension beam 58 is equipped with a swivel hook 66 which may receive tackle (not shown) for handling of the engine which is raised and lowered by the hoist.

Figure 6:
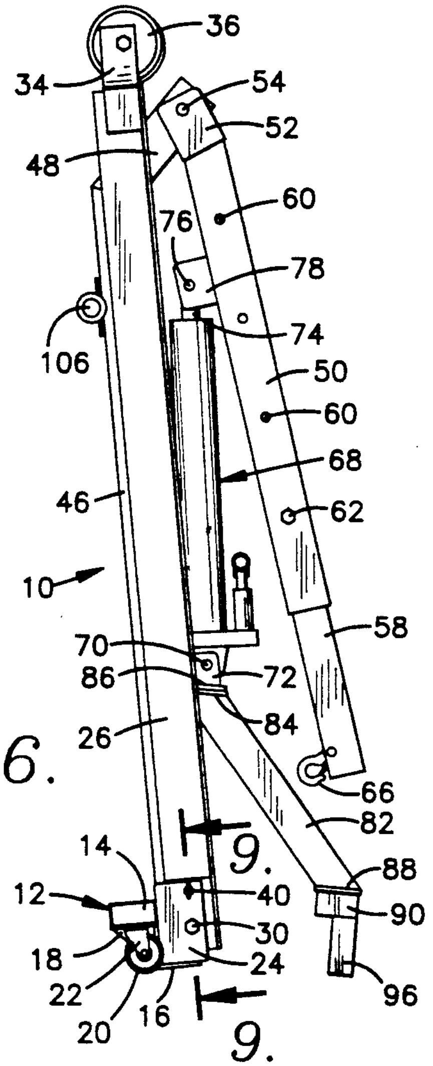
FIG. 6 is a side elevational view similar to FIG. 5, but showing the elongated feet pivoted upwardly to the storage position of the hoist.
Figure 5:
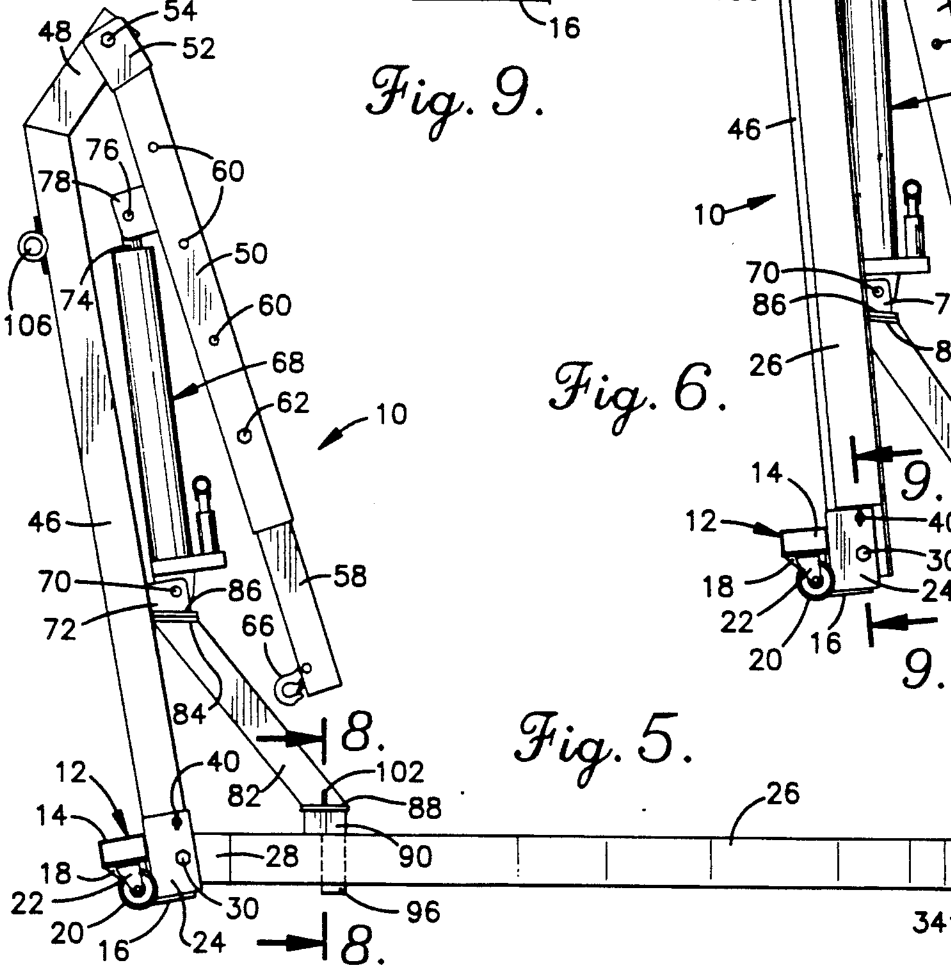
FIG. 5 is a side elevational view of the hoist similar to FIG. 1, but showing the jack mechanism fully retracted to lower the lifting beam and with the extension beam fully retracted.

A conventional mechanical jack 68 is used to raise and lower the lifting beam. The base end of the jack 68 is pivotally connected at 70 to a bracket 72 which is secured to the post 46 at an intermediate location thereon. The pivot axis 70 is horizontal and may be provided by a suitable fastener such as a bolt. The jack has a rod 74 which extends and retracts relative to the base of the jack. The end of the rod is pivotally connected at 76 between a pair of bracket plates 78 which are secured to the lifting beam 50. When the jack 68 is fully retracted as shown in FIGS. 5 and 6, the lifting beam is fully lowered and extends generally downwardly from the top end 48 of the post. When the rod 74 is partially extended, the lifting beam 50 extends horizontally as shown in solid lines in FIG. 1 so that the hook 66 may be positioned above the engine which is to be handled. When the rod is further extended, the lifting beam 50 is raised to the broken line position of FIG. 1 in order to raise the engine. The jack 68 may be of conventional construction and may be operated by reciprocating a jack handle 80 (see FIG. 4) applied to the jacking mechanism.

Structural bracing between the post 46 and feet 26 is provided by a brace structure which includes an inclined base 82 having a flanged top end 84. The bracket 72 which is used to mount the jack 68 on post 46 is provided on its bottom with horizontal flanges 86. Suitable fasteners such as bolts ar used to rigidly connect the flanged top end 84 of brace 82 to the bottom of the flanges 86.

Figure 8:
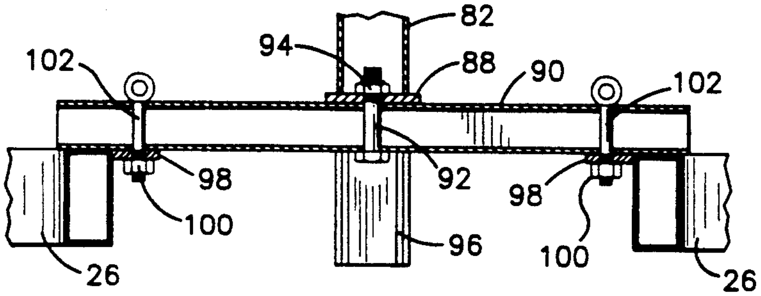
FIG. 8 is a fragmentary sectional view on an enlarged scale taken generally along line 8—8 of FIG. 5 in the direction of the arrows.

The brace 82 extends downwardly and forwardly at an incline from the bracket 72. The lower end of the brace 82 is provided with a bracket plate 88. As best shown in FIG. 8, a cross arm 90 is applied to the bottom of the brace 82. A bolt 92 is extended upwardly through the center of the cross arm 90 and through the flange 88. A nut 94 is welded to the upper surface of the flange 88, and the bolt 92 is threaded through the nut 94 in order to mount the cross arm 90 on the lower end of brace 82 for pivotal movement about the vertical axis of the bolt 92.

The cross arm 90 is provided at its center with a foot extension which may take the form of a channel 96 extending downwardly from the center of the cross arm 90. The channel 96 is open on one side to provide access for application of the bolt 92.

With continued reference to FIG. 8 in particular, the cross arm 90 normally extends parallel to the base 12 and spans the two feet 26 in a manner to lie on top of the feet and also on top of a pair of tabs 98 which project inwardly from the respective feet 26. A nut 100 is welded to the underside of each tab 98 in alignment with an opening through the tab. The cross arm 90 is provided with openings which are located to align with the openings in the tabs when the cross arm is oriented to span the two feet 26. A pair of eye bolts 102 are extended through the openings in the cross arm 90 and are threaded through the nuts 100, thus securing the cross arm 90 to the two feet 26 and also securing the cross arm against pivotal movement about the axis of the bolt 92. The brace 82 and the cross arm 90 then cooperate to provide a rigid brace structure between the post 46 and the feet 26 while at the same time locking the feet 26 in their operating positions.

The back side of the post 46 is equipped with a horizontal handle bar 104 which may be suitably fastened to the post at an elevated position thereon. The opposite ends of the bar 104 are provided with hand grips 106 for conveniently receiving the hands.

When the hoist is to be used for the handling of an engine, it is secured in the operating position with the eye-bolts 102 tightened in order to lock the feet 26 in place with the brace structure rigidly connected to perform its bracing and strengthening function. The user of the hoist can stand behind the post 46 and grasp the two hand grips 106 in the hands to facilitate rolling of the hoist forwardly with the wheels 20 and 36 rolling along the floor or other supporting surface toward the vehicle. The caster wheels 20 facilitate steering of the hoist as it is rolled along the floor. While the hoist is being initially positioned, the jack 68 is preferably extended partially such that the lifting beam is generally horizontal as shown in solid lines in FIG. 1. The extension beam 58 is adjusted in or out as desired and secured by application of the bolt 62 and nut 64.

When the hook 66 is properly located above the engine and the hoisting tackle has been applied to the hook 66 and the engine, the jack 68 can be extended further in order to raise the lifting beam to the position shown in solid lines in FIG. 1. This results in lifting of the engine out of the engine compartment.

The hoist can then be rolled away from the vehicle to a suitable position for working on the engine, and the lifting beam can then be lowered to lower the engine. After the engine has been repaired, it can be replaced (or, alternatively, a different engine can be installed in the vehicle) by rolling the hoist to the vehicle and subsequently lowering the lifting beam to lower the engine into the engine compartment at the proper location.

In addition to the structural enhancement of the hoist that is provided by the brace structure, the elongated feet 26 and their diverging arrangement provide the hoist with stability while handling heavy engines.

When the hoist 10 is not in use, it can be folded into a compact storage position which minimizes the space needed for storage of the hoist. The extension beam 58 can be retracted fully and the jack 68 can be fully retracted to position the lifting beam in the position shown in FIGS. 5 and 6. In this position, the outward extension of the lifting beam is minimal. In order to fold up the feet 26, the eye-bolts 102 are threaded out of the nuts 100, and the cross arm 90 is then swung about the axis of the bolt 92, as shown in broken lines in FIG. 2. When the cross arm has been pivoted far enough to clear the two feet 26, the feet can be swung upwardly about the axes of bolts 30 to the storage position. The feet 26 can be latched in the storage position by tightening the eye-bolts 40 until their tips enter and are secured in the tapered openings 42. When the feet 26 are raised to the storage position, the bottom end of the channel 96 rests on the floor to provide support for the unit when it is being stored. In the operating position of the hoist, the channel 96 is located slightly above the floor and only the wheels 20 and 36 are in contact with the floor.

Figure 7:
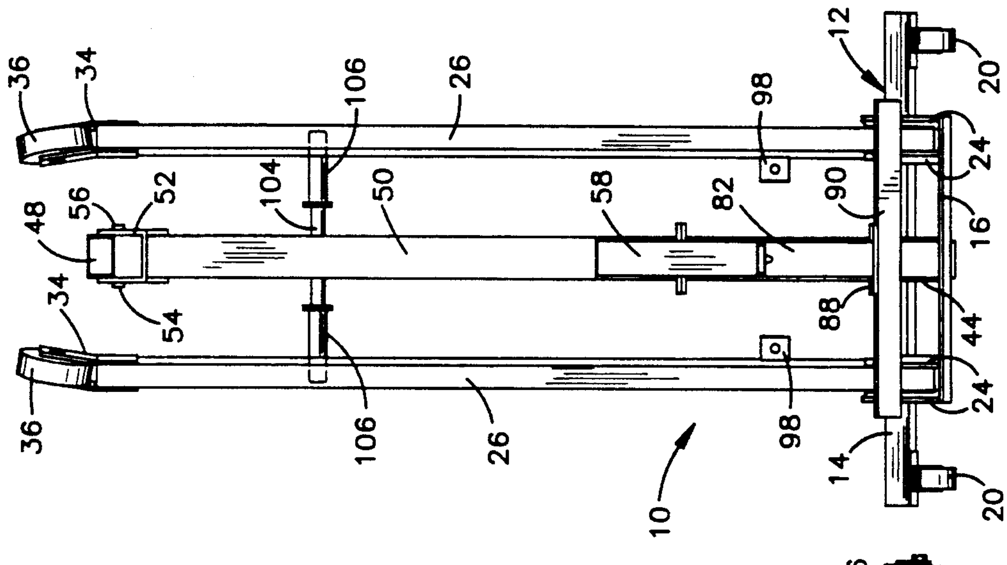
FIG. 7 is a front elevational view similar to FIG. 4, but with the hoist in the storage condition.

As best shown in FIG. 7, the feet 26 are oriented parallel to and are on opposite sides of the post 46 in the storage position. Because of the angled orientation of the bracket plate 24, the feet 26 are parallel to one another and to the post 46 in the storage position, even though the legs diverge in the operating position. This minimizes the width of the unit in the storage condition and further reduces the space requirements.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, I claim:

1. A portable engine hoist comprising:

a base having a pair of spaced apart wheels thereon for rolling on a support surface;

a pair of elongated feet each connected at one end thereof with said base for pivotal movement between an operating position wherein the feet extend in a generally horizontal orientation and a storage position wherein the feet extend in a generally vertical orientation;

wheel means on each foot for rolling on the support surface in the operating position of the feet;

means for releaseably locking each foot in the operating position;

an upright post extending from said base;

an inclined brace having upper and lower ends, said upper end being connected rigidly with said post;

a cross arm connected with the lower end of said brace and spanning said feet in the operating position thereof, said releaseable locking means acting to releaseably lock said cross arm to both feet with the brace and cross arm providing a rigid brace structure between the post and feet;

means for releaseably latching each foot in the storage position;

a lifting beam pivotally connected with said post; and means for pivoting said beam relative to said post to raise and lower an engine carried on the lifting beam.

2. An engine hoist as set forth in claim 1, wherein said means for pivoting said beam comprises:

an extensible and retractable jack mechanism having a base end and a rod end;

means for pivotally connecting said rod end of the jack mechanism with said beam;

a bracket on said post; and means for pivotally connecting said base end of the jack mechanism with said bracket, whereby extension of the jack mechanism effects pivotal raising of the lifting beam.

3. An engine hoist as set forth in claim 2, wherein said brace is rigidly connected at the upper end thereof with said bracket.

4. An engine hoist as set forth in claim 1, including a foot extension on said cross arm at a location between said feet, said foot extension contacting the support surface to support the hoist thereon in cooperation with said wheels in the storage position of the feet.

5. An engine hoist as set forth in claim 1, wherein said cross arm is connected with the lower end of said brace for movement about a generally vertical pivot axis between a first position wherein the cross arm spans said feet in the operating position thereof and a second position wherein the cross arm is clear of the feet to permit pivoting of the feet to the storage position.

6. An engine hoist as set forth in claim 5, wherein said releaseable locking means comprises:

a locking element on each foot having an opening aligned with an opening in the cross arm when the cross arm is in the first position and the feet are in the operating position; and a pair of removable fasteners for insertion through the aligned openings of the locking elements and cross arm.

7. A portable engine hoist comprising:

a base having opposite ends each equipped with a wheel for rolling movement along a support surface;

a pair of elongated feet each having inboard and outboard ends and a wheel on the outboard end for rolling movement along the support surface;

means for connecting each foot with said base for movement about a substantially horizontal pivot axis between an operating position wherein the foot extends generally horizontally with the wheel thereon contacting the support surface and a storage position wherein the foot extends generally vertically;

means for releaseably latching each foot in the storage position;

an upright post extending from said base;

an inclined brace connected at one end with said post and angling downwardly away from the post;

a cross arm connected with said brace;

releaseable means for rigidly connecting each foot to said cross arm in the operating position of the foot, whereby said brace and cross arm provide a rigid brace structure between the post and feet;

a lifting beam pivotally connected with said post; and means for pivoting said beam relative to said post to raise and lower an engine carried on the lifting beam.

8. An engine hoist as set forth in claim 7, wherein said cross arm is connected with the lower end of said brace for movement about a generally vertical pivot axis between a first position wherein the cross arm spans said feet in the operating position thereof and a second position wherein the cross arm is clear of the feet to permit pivoting of the feet to the storage position.

9. An engine hoist as set forth in claim 8, wherein said releaseable means for connecting each foot to said cross arm comprises:

a locking element on each foot having an opening aligned with an opening in the cross arm when the cross arm is in the first position and the feet are in the operating position; and a pair of removable fasteners for insertion through the aligned openings of the locking elements and cross arm.

10. An engine hoist as set forth in claim 8, including a foot extension on said cross arm at a location between said feet, said foot extension contacting the support surface to support the hoist thereon in cooperation with said wheels in the storage position of the feet.

11. An engine hoist as set forth in claim 7, including a foot extension on said cross arm at a location between said feet, said foot extension contacting the support surface to support the hoist thereon in cooperation with said wheels in the storage position of the feet.

12. An engine hoist as set forth in claim 7, wherein:

said feet are oriented to diverge from the inboard to the outboard ends in the operating position; and said means for connecting each foot is arranged to orient said feet substantially parallel to on another in the storage position.

13. A portable engine hoist comprising:

a base having wheel means thereon for rolling movement along a support surface;

an upright post extending from said base;

a pair of elongated feet each having inboard and outboard ends;

a wheel on the outboard end of each foot for rolling contact with the support surface;

means for connecting the inboard end of each foot with said base in a manner permitting the feet to pivot between an operating position wherein the feet extend horizontally from the base and diverge away from the base with said wheels in contact with the support surface, and a storage position wherein the feet extend generally vertically on opposite sides of said post;

means for releaseably latching said feet in the storage position;

an inclined brace having upper and lower ends, said upper end being connected to said post with the brace inclining downwardly away from the post;

a cross arm pivotally connected with the lower end of said brace for movement about a generally vertical pivot axis between a first position wherein the cross arm spans said feet in the operating position thereof and a second position wherein the cross arm is clear of the feet to permit pivoting of the feet to the storage position;

releaseable means for locking said cross arm to both feet with the cross arm in said first position and said feet in the operating position;

a lifting beam pivotally connected with said post; and means for pivoting said beam relative to said post to raise and lower an engine carried on the lifting beam.

14. An engine hoist as set forth in claim 13, wherein said feet extend substantially parallel to one another in the storage position.

15. An engine hoist as set forth in claim 14, wherein each of said feet extends substantially parallel to said post in the storage position.

16. An engine hoist as set forth in claim 1, wherein said feet are arranged to diverge away from said base in the operating position and extend substantially parallel to one another in the storage position.

* * * * *